R. STENDEL.
GUARD FOR MOTOR CYCLES.
APPLICATION FILED JULY 13, 1921.
1,422,632.
Patented July 11, 1922.
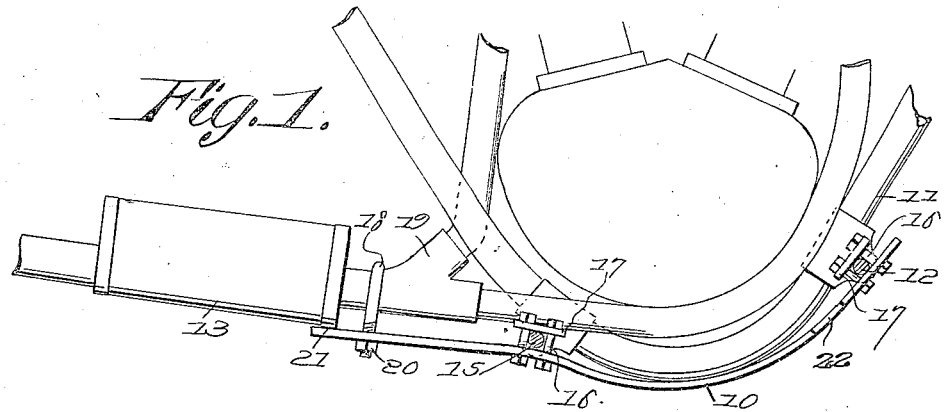
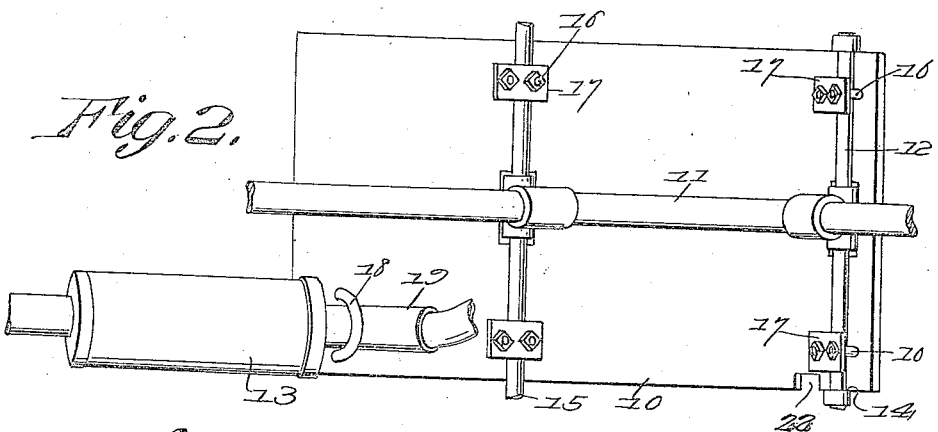
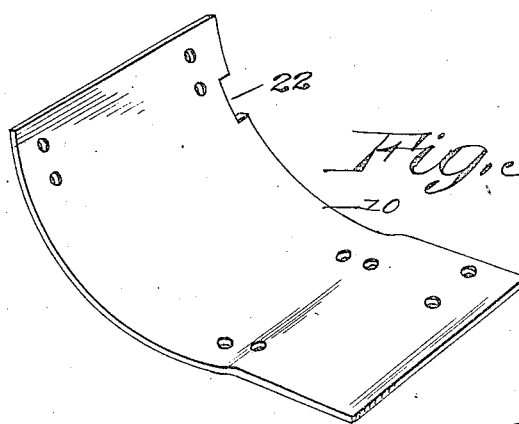
Inventor
Roy Stendel
By
Attorney

UNITED STATES PATENT OFFICE.

ROY STENDEL, OF MAGDALENA, NEW MEXICO.

GUARD FOR MOTOR CYCLES.

1,422,632.  Specification of Letters Patent.  Patented July 11, 1922.

Application filed July 13, 1921. Serial No. 484,399.

*To all whom it may concern:*

Be it known that I, ROY STENDEL, a citizen of the United States of America, residing at Magdalena, in the county of Socorro and State of New Mexico, have invented new and useful Improvements in Guards for Motor Cycles, of which the following is a specification.

The object of the invention is to provide an efficient means for protecting vehicles of the motorcycle type from flying stones and high centers and for minimizing the tendency to overturning by giving the machine a lower riding balance; and with these objects in view the invention consists in a construction and combination of parts of which a preferred embodiment is shown in the accompanying drawings, wherein:—

Figure 1 is a side view of a machine having applied in the operative position thereto a guard embodying the invention.

Figure 2 is a plan view of the structure as shown in Figure 1.

Figure 3 is a detail view in perspective of the guard detached.

The guard consists essentially of a plate of heavy metal such as boiler plate, indicated at 10 and longitudinally curved or of arcuate form to follow the general contour of the frame 11 of the vehicle (that which is illustrated in the drawing and is used merely as a typical form being of the Harley-Davidson type), the same extending from the front rest bar 12 to the muffler 13 and laterally from the shoulder 14 on the end of the front rest bar to the shoulder on the opposite end of the bar (a distance in practice of about nine inches) said plate being clamped to the foot rest bar and to the bar 15 by means of bolts 16 and straps 17 with a U-clamp 18 extending over the exhaust-Y 19 and having its extremities passed through the plate for engagement by nuts 20. The rear edge of the guard plate preferably extends under the end of the muffler 13 as indicated at 21 to serve as the means of steadying the latter, and at 22 the plate is slotted to allow the foot rest bar brackets to extend through so that the plate may be fitted snugly against the frame.

Located as indicated the guard plate not only protects the machine but also the rider from flying stones and serves as a means of sliding over obstructions which may be in the path of the machine and over which the front wheel may have passed, and as will be obvious the device will also act efficiently to protect the muffler and minimize the tendency of catching the forward end thereof upon an uprising obstruction on the road surface.

Having described the invention, what is claimed as new and useful is:

1. A guard for motorcycles and the like having an arcuate plate extended longitudinally beneath the vehicle frame from the front foot rest bar to the muffler and conforming substantially to the shape of the lower side of the frame, means being provided for securing said plate to the foot rest bars.

2. A guard for motorcycles and the like having an arcuate plate extended longitudinally beneath the vehicle frame from the front foot rest bar to the muffler and conforming substantially to the shape of the lower side of the frame, means being provided for securing said plate to the foot rest bars, and the plate being slotted for the reception of the foot rest brackets.

3. A guard for motorcycles and the like having an arcuate plate extended longitudinally beneath the vehicle frame from the front foot rest bar to the muffler and conforming substantially to the shape of the lower side of the frame, means being provided for securing the same to the foot rest bars and the exhaust-Y and the rear edge of the plate extending under the forward end of the muffler.

In testimony whereof he affixes his signature.

ROY STENDEL.